Figure 1:
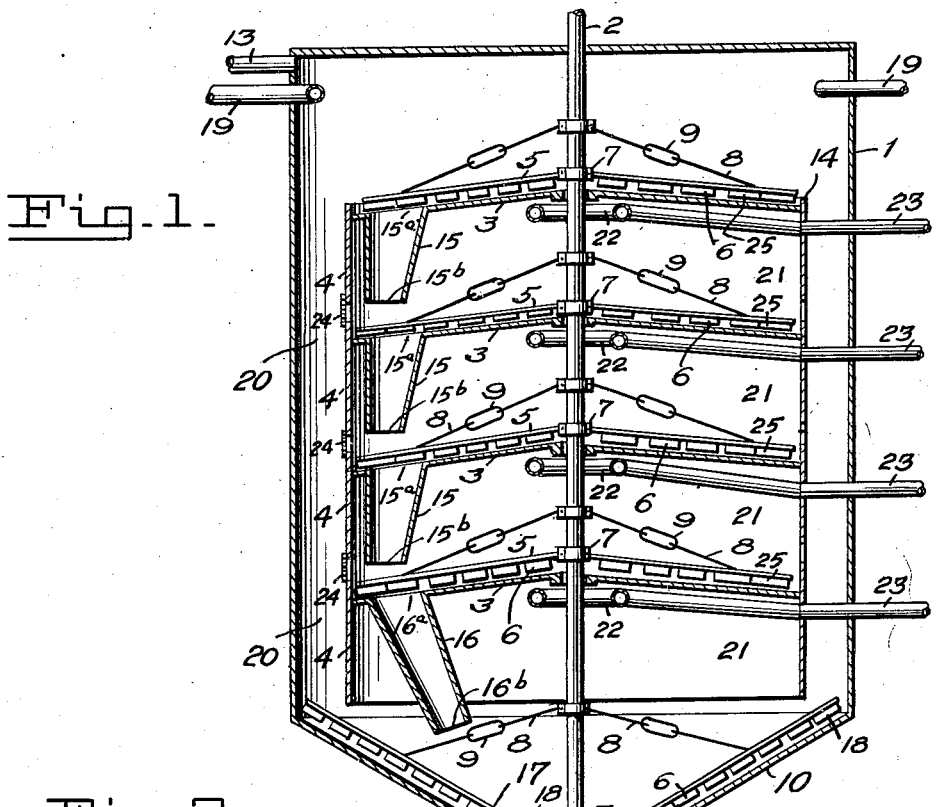

June 22, 1948.　　G. V. MALMGREN　　2,443,686
MUD CHANNEL STRUCTURE FOR TRAY TYPE CLARIFIERS
Filed Oct. 8, 1946

Inventor,
George V Malmgren
By: Henry C Parker
Attorney

Patented June 22, 1948

2,443,686

UNITED STATES PATENT OFFICE 2,443,686

MUD CHANNEL STRUCTURE FOR TRAY TYPE CLARIFIERS

George V. Malmgren, Chicago, Ill.

Application October 8, 1946, Serial No. 702,019

20 Claims. (Cl. 210—55)

This invention relates to clarifiers; and it comprises a clarifier suitable for use in clarifying and purifying industrial liquors, such as those obtained during the defecation of sugar juices, in sewage disposal, in the softening of boiler waters, in water purification and the like; said clarifier comprising a cylindrical tank, a plurality of superposed trays mounted centrally in said tank, said trays having depending peripheral flanges which define, with said trays, a plurality of superposed clarifying zones and with said tank wall, a peripheral downtake for raw liquor to be clarified, means for introducing raw liquor to be clarified into the top of the tank, means for introducing raw liquor from said peripheral downtake into the bottoms of said clarifying zones, means for withdrawing clear liquor from the central upper portions of said clarifying zones, depending hoppers mounted beneath said trays close to the peripheries thereof, having openings flush with the tops of the trays, said hoppers being aligned from tray to tray and forming a discharge conduit for delivering sludge solids into the bottom of said tank, scrapers operating on the tops of the trays to scrape sludge into said depending hoppers and means for removing sludge from the bottom of said tank; all as more fully hereinafter set forth and as claimed.

The clarification of industrial liquors is an ancient art and many types of clarifiers have been designed for that purpose. Multiple tray clarifiers have been introduced relatively recently and several different types of these have been successful in the industrial arts. Until rather recently it has been supposed that, in the operation of these multi-tray clarifiers, an advantage was gained by mixing sludge solids deposited on top of the trays with the raw liquor, to be clarified. But it has been found that these solids frequently become re-suspended in the raw liquor and hence, in the clarification of many types of liquors, the mixing of sludge with the raw liquor retards rather than assists in the clarification procedure. Recently several multitray clarifier designs have been proposed which provide separate conduits through which the sludge is discharged from the trays with a minimum of contact with the raw liquor. In some of these designs the clarifiers have been provided with central clarifying zones surrounded by a peripheral downtake but in each of these cases the peripheral downtake has been at least partly obstructed by the sludge discharge means. I have found this to be highly objectionable.

In the clarifying art it is well recognized that a slow rotary action of a liquor containing suspended solids tends to produce rapid flocculation of the suspended particles. The exact cause for this is unknown but it may be due to the fact that the particles tend to become classified to some extent by the centrifugal force generated by the rotary motion. It is of particular advantage in clarifiers provided with centrally disposed clarifying zones and with a peripheral downtake to provide a rotary motion in the downtake. This rotary motion substantially increases the rate of flocculation and hence increases the capacity of such clarifiers. When the peripheral downtake is obstructed by one or more sludge discharge conduits, rotary motion in the downtake is not feasible. If rotary motion should be attempted in such a clarifier, the obstructions would produce eddys which would impair the clarification.

Clarifiers have been proposed in which the trays have been equipped both with peripheral and central depending flanges, the latter forming discharge conduits for the sludge. In these clarifiers the depending central flanges or boots have extended to points just above the trays in order to provide annular discharge openings for the sludge from the trays. It has been found that it is impossible to prevent a flow of raw liquor through the central discharge conduits of this type of clarifier and this raw liquor, feeding centrally into the clarifying zones, has produced upflows of liquor and sludge at the worst possible points, namely in the centers of the clarifying zones. For best results the clear liquor draw-offs should be placed in the upper central portions of the clarifying zones and any upflow of sludge and raw liquor in the neighborhood of these draw-offs is, of course, fatal to proper clarification.

I have discovered a rather simple solution for the above difficulties. I have found that, if the sludge discharge conduit is formed by depending hoppers which are mounted beneath and within the confines of the trays but close to their peripheries, raw liquor circulating in this conduit does no harm because any upflows produced at the bases of the hoppers occur close to the peripheries of the clarifying zones and hence at maximum distances from the clear liquor draw-offs. When the sludge discharge conduit is positioned in this manner, the peripheral downtake for raw liquor is not obstructed and hence a rotary motion in this downtake can be employed with the attendant clarification advantages. I have found it advantageous to have the hoppers in the shape of truncated cones with those for the upper trays mounted with their outer sides parallel with the depending flanges of the trays so that the lower ends of the hoppers are close to the peripheries of the trays. The lowest hopper is preferably so shaped and mounted that it directs the sludge passing therethrough close to the center of the bottom of the tank. It is also advantageous to provide covers over the annular openings into the clarifying zones in the neighborhood of the hoppers to prevent any cross-flows of liquor at the points where the upper hoppers discharge into the lower hoppers. Special sludge scrapers must be provided for the trays equipped with outer scraper blades which scrape precipitated sludge away from the peripheries of the trays into the hoppers while the inner blades move the sludge from the centers of the trays into the hoppers. It is also advantageous to provide a rather low upstanding peripheral flange on each tray to prevent the sludge from falling off the outer edges of the trays. The spaces in between the upstanding flanges on the trays and the depending flanges from the trays above provide inlets for the raw liquor flowing into the clarifying zones. Otherwise my clarifiers can be constructed in conventional fashion.

One advantage of my new clarifier design is that it is relatively easy to convert several of the clarifiers now on the market into the new form. In some cases it is merely necessary to install my sludge discharge hoppers between the trays, which is a relatively simple operation and then to replace or remount one or two of the outer scraper blades so that they will scrape sludge from the outer edges of the trays into the hoppers. It is usually desirable to have the outer scraper blades of V-shape so that pockets are formed in which the sludge collects prior to its discharge into the hoppers.

Figure 2:
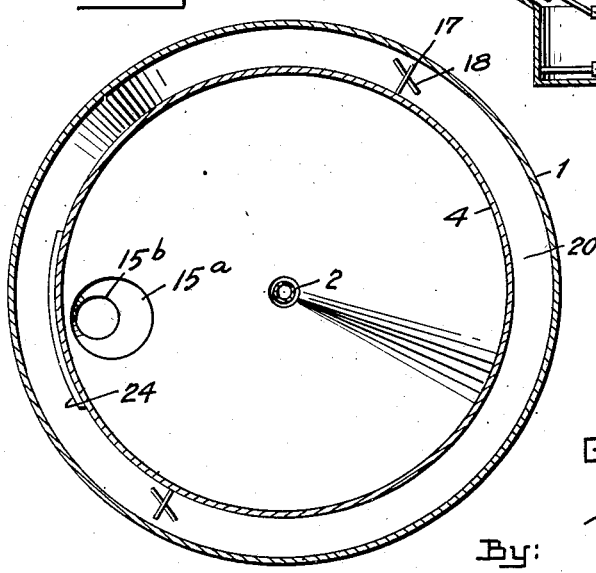
Figure 3:
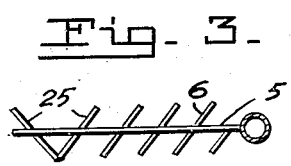

My invention can be described in greater detail by reference to the accompanying drawing which shows, more or less diagramatically, a preferred embodiment of my clarifier. In this showing Fig. 1 is a vertical cross section through the center of the clarifier, Fig. 2 is a horizontal section taken just above one of the upper trays with the scraper arm omitted, while Fig. 3 shows a scraper arm and blades to be used with the clarifier.

In the various figures like parts are designated by like reference numerals. Referring to Fig. 1, the clarifier tank is shown at 1. A plurality of trays 3 mounted centrally in the tank by means not shown and these are provided with depending peripheral flanges 4 which with the trays define clarifying zones 21. A vertical shaft 2 is mounted centrally in the tank and this shaft is rotated slowly by conventional means not shown. Attached to collars 7 on the shaft are scraper arms 5 which are equipped with scraper blades 6. The scraper arms are supported by cables 8 and turnbuckles 9. The outer scraper blades 25 form V-shaped pockets, as shown best in Fig. 3, which pockets collect sludge which is then discharged into the mouths 15a of the hoppers 15 as the scraper arms pass over these hoppers. The hoppers are mounted, as shown beneath and close to the peripheries of the trays and, of course, several may be provided for each tray, if desired. It will be noted that the discharge ends 15b of the upper hoppers are mounted directly into the next lower hopper. The upper openings are flush with the tops 3 of the trays. The trays may be provided with short upstanding flanges 14 which extend close to the depending flanges on the upper trays, leaving annular spaces therebetween which serve as passageways for the raw liquor flowing into the clarifying zones. These annular passageways are advantageously closed off by means of baffles or covers 24 mounted in front of the hoppers 15, in order to prevent a cross flow of liquor between hoppers. The bottom 10 of the tank is dished and at its center it is provided with a sludge sump 11. Sludge collecting in the sump is discharged through the pipe 12. The scraper arm 17 which operates along the bottom of the tank is provided with conventional scraper blades 6 and 18. Raw liquor to be clarified is introduced into the top of the tank tangentially through pipes 19 which at their ends are bent at right angles to produce a rotary motion to the liquor. This rotary motion extends down through the peripheral downtake 20 between the tank wall and the depending flanges on the trays. Any foam collecting on top of the liquor in the tank is drawn off through the pipe 13. The clear liquor which collects at the tops of the clarifying zones passes into the manifolds 22, being drawn off through the pipes 23. The manifolds 22 are located close to the centers and tops of the clarifying zones. The liquor in the neighborhood of these clear liquor draw-offs is quiescent owing to the fact that these draw-offs are located at the maximum possible distance from the discharge ends of the hoppers 15 and from the annular passageways between the flanges of the trays. The lower hopper 16 is shaped differently, as shown in Fig. 1, and is adapted to discharge the sludge from its lower end 16b close to the center of the bottom of the tank.

While I have described what I consider to be the most advantageous embodiments of my invention, it is evident, of course, that various modifications can be made in the specific structures which have been described without departing from the purview of this invention. For example, the upstanding flanges on the trays are not required provided that the outer scraper blade is shaped in such fashion that the sludge is scraped inwardly from the edges of the trays. The hoppers can be made in the shape of cylinders rather than truncated cones, if desired. The trays of my clarifier can be sloped in either direction, that is, they can be belled or dished and may slope at an angle of 15° or more to the horizontal. The term "substantially horizontal" as used in the claims is intended to cover trays which may be sloped at any angle insufficient to cause the sludge to slide off the trays and which, therefore, require scrapers for removing the sludge. The clarifying zones may be made of varying height, if desired, and there is some advantage in having the bottom zone deeper than those above since this zone is required to handle all the sludge discharged from the upper trays as well as that carried by the raw liquor which enters this zone. If desired special means, such as steam jets, can be provided for producing a rotary motion in the peripheral downtake of my clarifier. Other modifications of my invention which fall within the scope of the following claims will be immediately evident to those skilled in this art.

What I claim is:

1. In a clarifier of the type provided with centrally mounted substantially horizontal trays having depending flanges defining, with said trays, a plurality of superposed clarifying zones and annular openings for the raw liquor entering said clarifying zones, and serving to define with the tank wall, a peripheral downtake for raw liquor, said clarifier also being provided with means at the top of the tank for feeding raw liquor and with means for drawing off clear raw liquor from said clarifying zones; the improvement which comprises at least one depending hopper mounted beneath each of said trays having openings flush with the surfaces of the trays and discharging into hoppers aligned therewith and mounted on the trays beneath, said aligned hoppers forming a sludge discharge conduit leading to the bottom of the tank and being mounted within the confines of said depending flanges but close to the peripheries of said trays, scraper means for moving sludge deposited on said trays into said hoppers and means for removing said sludge from the bottom of said tank.

2. The clarifier of claim 1 wherein said clear liquor draw-off means are located at the tops and close to the centers of said clarifying zones.

3. The clarifier of claim 1 including means for producing a rotary motion of the liquor to be clarified in the peripheral downtake of the clarifier.

4. The clarifier of claim 1 wherein the raw liquor is introduced tangentially in the top of said tank in order to produce a rotary motion in the peripheral downtake of the clarifier.

5. The clarifier of claim 1 wherein upstanding peripheral flanges are provided on the trays which approach but do not meet the depending flanges from the trays above leaving therebetween said annular openings for raw liquor entering said clarifying zones.

6. The clarifier of claim 1 wherein sludge scrapers are mounted on the tops of the trays and provided with outer scraper blades for scraping sludge from the peripheral edges of the trays into said hoppers.

7. The clarifier of claim 1 wherein sludge scrapers are mounted on the tops of the trays and provided with outer scraper blades shaped to form a pocket in which sludge collects prior to its discharge into said hoppers upon passage of said pockets over the openings of said hoppers.

8. The clarifier of claim 1 wherein said scraper means are provided with V-shaped outer scraper blades adapted to move sludge into said hoppers.

9. The clarifier of claim 1 wherein said hoppers are in the shape of truncated cones and are mounted so that their outer sides are substantially parallel with the peripheral flanges of said trays.

10. The clarifier of claim 1 wherein the lowest hopper is so shaped and mounted that it directs sludge collected therein towards the center of the bottom of the tank.

11. The clarifier of claim 1 wherein means are provided for preventing a cross flow of liquor between said hoppers.

12. The clarifier of claim 1 wherein means are provided for covering said annular openings for raw liquor entering said clarifying zones in the neighborhood of said hoppers.

13. A clarifier comprising a cylindrical tank, means for introducing raw liquor to be clarified into the top of said tank, a plurality of substantially horizontal trays mounted centrally in said tank and leaving a peripheral downtake for raw liquor between the peripheries of the trays and the tank wall, depending peripheral flanges mounted on said trays so as to define a plurality of superposed clarifying zones beneath the trays and to leave annular openings from said downtake into said clarifying zones, means for withdrawing clear liquor from said clarifying zones mounted close to the tops and centers of said clarifying zones, a series of depending hoppers mounted beneath said trays within the confines of but close to the peripheries of said trays, said hoppers having openings flush with the tops of said trays and being aligned so as to discharge into each other and to conduct sludge into the bottom of said tank, means mounted on the tops of the trays to move sludge deposited thereon into said hoppers and means for removing sludge from the bottom of said tank.

14. The clarifier of claim 13 wherein means are provided for producing a rotary motion of the liquor to be clarified in the top of said tank and in the peripheral downtake.

15. The clarifier of claim 13 wherein the raw liquor is introduced tangentially into the top of said tank.

16. The clarifier of claim 13 wherein said trays are provided with upstanding peripheral flanges which approach but do not meet said depending flanges leaving therebetween said annular openings for raw liquor entering said clarifying zones.

17. The clarifier of claim 13 wherein said sludge moving means comprises outer scraper blades adapted to move sludge from the peripheries of the trays into said hoppers.

18. The clarifier of claim 13 wherein said sludge moving means comprises scraper blades forming pockets for collecting the sludge and for discharging it into said hoppers.

19. The clarifier of claim 13 wherein said sludge moving means comprises outer scraper blades having a V-shape adapted to collect sludge and discharge it into said hoppers.

20. The clarifier of claim 13 wherein said hoppers are of the shape of truncated cones and are mounted so that their outer edges are substantially parallel with said depending flanges.

GEORGE V. MALMGREN.

REFERENCES CITED

The following references are of record in the file of this patent:

UNITED STATES PATENTS

| Number | Name | Date |
| --- | --- | --- |
| 1,578,625 | Ankeny | Mar. 30, 1926 |
| 2,195,739 | Rolston | Apr. 2, 1940 |
| 2,340,132 | McHugh et al. | Jan. 25, 1944 |
| 2,355,875 | Lasseter | Aug. 15, 1944 |